United States Patent [19]

DuBos et al.

[11] Patent Number: 5,060,917
[45] Date of Patent: Oct. 29, 1991

[54] HYDRAULIC ANTIVIBRATORY DEVICES

[75] Inventors: Daniel DuBos, Asnieres; Jean-Luc Salaud, Conflans Sainte Honorine; Jean-Pierre Bretaudeau, Chateaudun, all of France

[73] Assignee: Hutchinson, France

[21] Appl. No.: 554,517

[22] Filed: Jul. 19, 1990

[30] Foreign Application Priority Data

Jul. 19, 1989 [FR] France ............................ 89 09721

[51] Int. Cl.[5] ............................................ F16F 15/04
[52] U.S. Cl. .................................................. 267/140.1
[58] Field of Search ................ 267/140.1 A, 140.1 R, 267/140.1 AE, 219, 35, 64.27; 248/562, 636; 188/298

[56]  References Cited
U.S. PATENT DOCUMENTS

| | | | |
|---|---|---|---|
| 3,669,225 | 6/1972 | Moulton et al. | 188/298 |
| 4,199,128 | 4/1980 | van den Boom et al. | 248/562 |
| 4,378,935 | 4/1983 | Brown et al. | 267/64.27 |
| 4,657,227 | 4/1987 | Hofmann | 267/35 X |
| 4,660,813 | 4/1987 | Reuter | 248/562 X |
| 4,757,982 | 7/1988 | Andrä et al. | 267/219 |
| 4,770,396 | 9/1988 | Jouade | 248/562 X |
| 4,869,478 | 9/1989 | Bouhours et al. | 248/562 X |

Primary Examiner—Robert J. Oberleitner
Assistant Examiner—Peter M. Poon
Attorney, Agent, or Firm—Larson and Taylor

[57] ABSTRACT

An improved hydraulic antivibratory device is disclosed intended to be inserted for damping and connection purposes between two rigid elements, comprising an annular frame (1) and a rigid hub (2), fixed respectively to the two rigid elements, a frustroconical elastomer spring (3) interposed between the frame and the hub, a flexible and sealed membrane (4) carried by the frame, a rigid intermediate wall (5) defining two chambers (A, B), a restricted passage (6) causing the two chambers to communicate permanently together and a liquid (L) contained in the two chambers and in the restricted passage. The hub comprises a shoe (11) which is too large to pass through a washer (8) of the frame and this shoe is connected to an annular zone of the intermediate dividing wall by a sealed bellows (12).

6 Claims, 2 Drawing Sheets

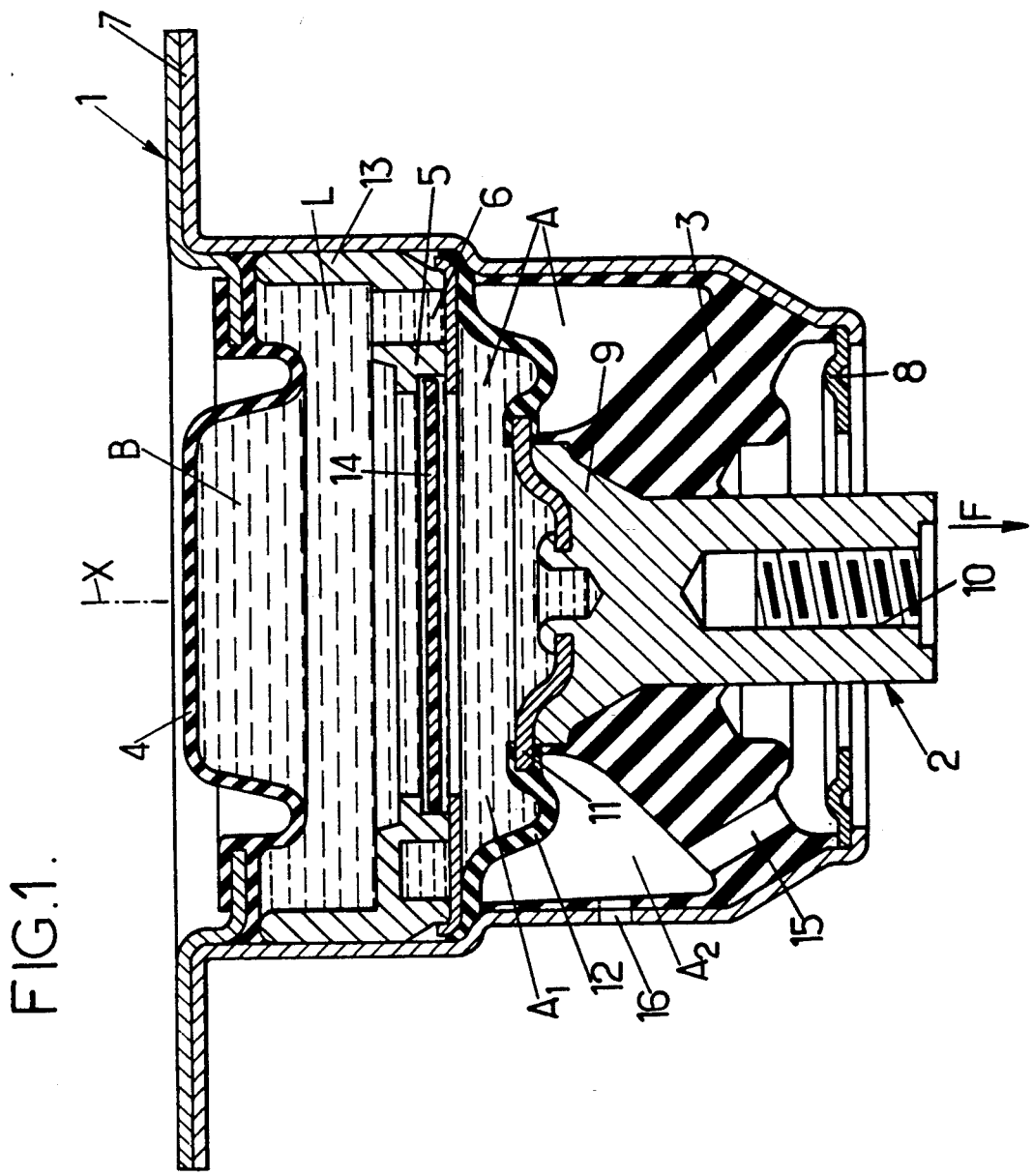

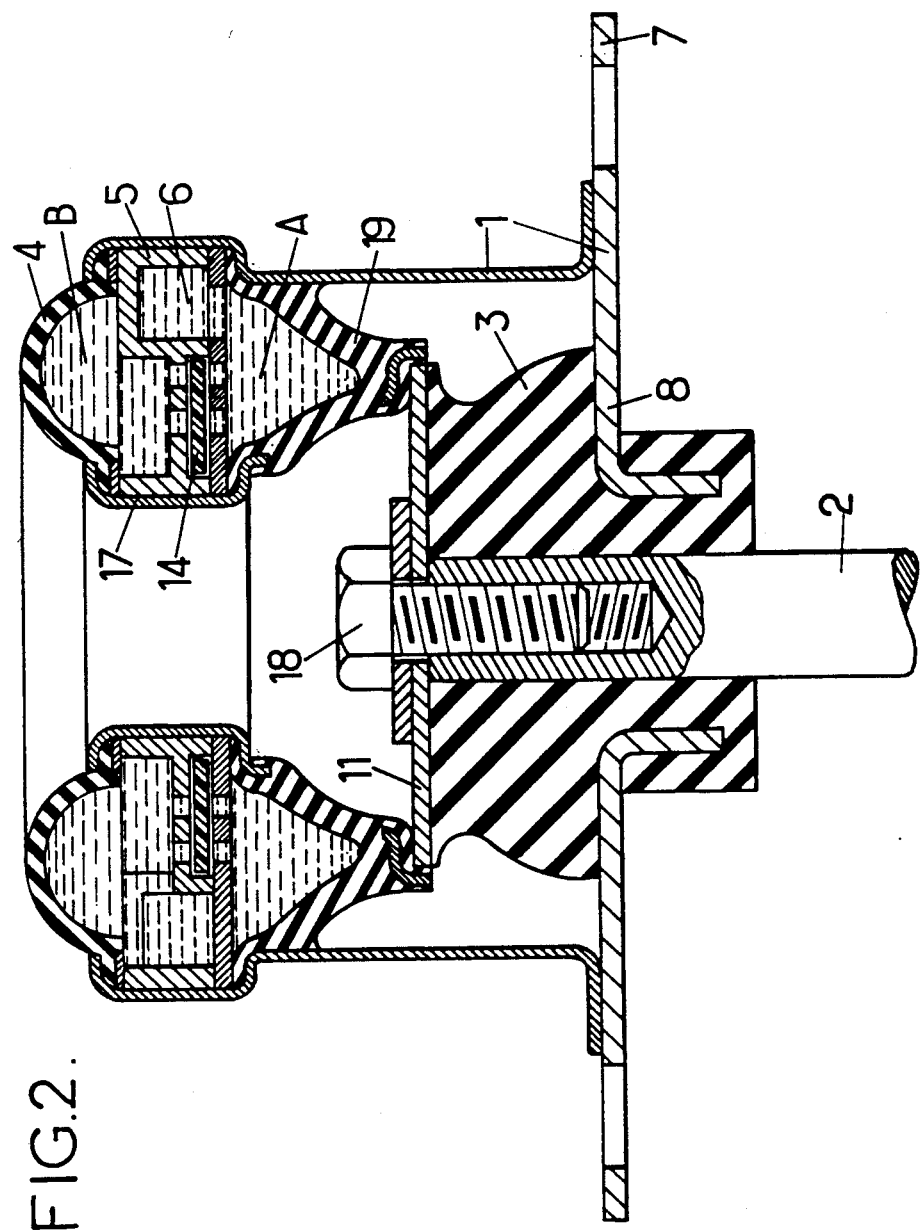

HYDRAULIC ANTIVIBRATORY DEVICES

The invention relates to hydraulic antivibratory devices intended to be inserted, for damping and connection, even support, purposes between two rigid elements such as a vehicle chassis and the engine of this vehicle.

It relates more particularly, among these devices, to those which comprise:
a rigid annular frame and a rigid base coaxial with this frame, able to be secured respectively to the two rigid elements to be joined together,
an annular elastomer spring with axis X resisting axial compression, inserted between the frame and the base,
a flexible sealed membrane carried by the frame and defining an enclosure therewith and with a second sealed flexible member,
a rigid intermediate dividing wall carried by the frame and dividing the inside of the enclosure into two chambers, a work chamber on the side of the spring and the other for compensation,
a restricted passage causing the two chambers to communicate permanently together,
and a liquid mass contained in the two chambers and the restricted passage.

With such a device, the application on one of the frames, in direction X, of oscillations with relatively large amplitude (generally greater than 0.5 mm) and of relatively low frequency (generally of the order of 5 to 20 Hz) causes the liquid to be driven from one of these two chambers to the other and conversely through the restricted passage, with the liquid mass thus driven being caused to resonate when the frequency of said oscillations reaches a pre-determined value which depends on the ratio between the axial length and the cross section of the restricted passage, such resonance providing excellent damping of the oscillations concerned.

The invention relates more particularly still, among the antivibratory devices of the above kind, to those in which:
on the one hand, the base is in the form of a shoe projecting transversely from a central foot,
and on the other hand, the annular frame comprises a rigid washer through which the foot passes and whose opening is too small to let the shoe pass axially.

These devices have the great advantage that they cannot be destroyed by axial tearing away because the shoe abuts against the edge of the washer.

But some of these devices risk creating an undesirable hydraulic effect because of the direct contact between the liquid and the elastomer spring and the restriction of the liquid masses present between the edges of the shoe and the facing walls of the work chamber.

In addition:
the flow of the liquid driven into the restricted passage during operation of the device is directly related to the shape adopted for the elastomer spring, since it is the face of this spring which defines in part directly the work chamber,
the elastomer spring must be strictly liquid-tight and it must be mounted in a strictly sealed way on the frame and the base which it joins together.

Certain restrictions result therefrom concerning the choice of the spring.

An object of the invention is especially to make the damping devices of the kind considered such that the above mentioned drawbacks are overcome, i.e. suppressing the creation of undesirable hydraulic effects and conferring a greater freedom in the choice of shapes and materials forming the spring.

For this, the antivibratory devices according to the invention are essentially characterized in that the second sealed flexible member is a bellows independent of the spring and only offering a low resistance to axial deformation and in that the periphery of the shoe is joined sealingly to the annular frame by at least one portion of this bellows.

In preferred embodiments, recourse is further had to one and/or other of the following arrangements:
the spring is frustroconical and is oriented so as to converge towards the centre of the device,
the bellows is made from elastomer,
the bellows is formed by a waterproofed cloth,
the spring is formed by an elastomer body with through apertures,
the enclosure formed by the two chambers is annular and has passing therethrough a screw which itself serves for securing the foot and the shoe together, the bellows connecting the edge of this shoe to respectively the internal and external edges of the intermediate dividing wall, then annular.

Apart from these main arrangements, the invention comprises certain other arrangements which are preferably used at the same time and which will be more explicitly discussed hereafter.

In what follows, two preferred embodiments of the invention will be described with reference to the accompanying drawings in a way which is of course in no wise limitative.

FIGS. 1 and 2 of these drawings show in axial section respectively two hydraulic antivibratory devices constructed in accordance with the invention.

The antivibratory device shown in FIG. 1 comprises:
a rigid annular frame 1 with vertical axis X and a coaxial hub 2 intended to be fixed respectively to the two rigid elements it is desired to mount one on the other with damping of their mutual oscillations, which elements may be for example form part of a vehicle chassis and an internal combustion engine or suspension train belonging to this vehicle,
a frustroconical elastomer spring 3 inserted vertically between frame 1 and hub 2,
a flexible and sealed membrane 4 mounted sealingly on frame 1 so as to form an enclosure therewith and with the spring 3,
a rigid, intermediate dividing wall 5 carried by the frame 1 and dividing the inside of the above enclosure into two chambers, one A, "work chamber", on the spring 3 side and the other B, "compensation chamber",
and a restricted passage 6 formed in dividing wall 5 and permanently connecting the two chambers A and B together.

The annular frame 1 is here in the form of a cylindrical sleeve whose upper end is extended radially by a horizontal external flange 7.

The base of this sleeve has a narrowed frustroconical shape and is extended internally by a rigid washer 8 crimped thereto.

Hub 2 has the general form of a cylindrical end-piece with axis X whose head 9, widening in the form of a truncated cone, is located in the centre of the device.

The base of this end-piece is formed axially with a threaded bore 10 for receiving a stud bolt of fixing bolt.

The frustroconical spring 3 connects the internal frustroconical face of the lower portion of sleeve 1 to the external frustroconical face of the head of hub 2.

In other words, this spring has a re-entrant form inside the support, converging towards the centre thereof.

Furthermore, head 9 of hub 2 is extended radially by a projecting shoe or sole-piece 11 of circular contour and, in accordance with the invention, the periphery of this shoe 11 is sealingly connected to the intermediate dividing wall 5 by a sealed and flexible bellows 12 having low resistance to axial deformation.

The portion of the intermediate dividing wall 5 to which the bellows 12 is connected is advantageously the periphery of this dividing wall.

But it could also be disposed in an intermediate region of this dividing wall, then having for example a diameter equal to the external diameter of the shoe, the bellows then having a profile with the external shape of a torus.

Connection between bellows 12 and the intermediate dividing wall 5 could also be located in a central zone of this dividing wall, the bellows being then in the form of a bag with its edge closed towards the shoe and with its bottom perforated by one end of the restricted passage 6.

Bellows 12 is formed more particularly from elastomer, reinforced or not, or else from a water-proofed cloth.

The inner dividing wall 5 is formed by a horizontal flange extending a cylindrical ring 13 inwardly, which ring is fitted jointingly in sleeve 1.

In a way known per se, the restricted passage 6 is formed along an arc of a circle with axis X in said flange 5 and opens respectively at both its ends on to the two faces of said flange.

The volume formed by chamber B, the restricted passage 6 and portion $A_1$, of chamber A, which is defined by dividing wall 5, shoe 11 and bellows 12 is filled with a damping liquid L such as water to which an anti-freeze has been added.

Such a device is intended to make possible the oscillations imposed on frame 1 with respect to hub 2 about axis X, while damping these oscillations if their frequency is sufficiently low, generally between 5 and 20 Hz and if their amplitude is sufficient, namely greater than 0.5 mm.

During the compression phase of each cycle, namely the application of a downward force on hub 2 with respect to frame 1 in the direction of arrow F, under the effect particularly of the weight of a load suspended from said hub 2, spring 3 is compressed and a portion of the liquid volume L contained in chamber B is driven towards the sub-chamber $A_1$ through passage 6, which results in slight flexional deformations of membrane 4 and bellows 12.

During the consecutive expansion phase, spring 3 expands and the above mentioned liquid volume portion passes back from sub-chamber $A_1$ to chamber B through passage 6.

This reciprocal movement of a small volume of liquid in passage 6 takes place at the rate of the oscillations to be damped and, for a given frequency of these oscillations, corresponding to given dimensioning of passage 6 — and more precisely to a given value of the ratio between the length of this passage and its mean width or "fictitious diameter"— in the small volume in question there occurs a resonance phenomenon generating the damping of said oscillations.

In the figure a mobile valve 14 can also be seen mounted in the intermediate dividing wall 5, which here forms a rigid frame encaging said valve so as to limit the amplitude of its movements to a low value, generally about 0.5 mm.

As is known, the presence between the two chambers $A_1$ and B of this valve 14 — which could be replaced by a sealed flexible membrane sealingly connected to the rest of dividing wall 5 — filters the transfer of vibrations of small amplitude (less than 0.5 mm) and of relatively high frequency (generally greater than 20 Hz) from frame 1 to hub 2 and conversely.

Spring 3 is totally independent of bellows 12, which allows the two functions to be completely separated, that of mutually and resilient supporting or centering frame 1 and hub 2 and that of confining the damping liquid L.

Thus, said spring 3 may be formed with through bores or even apertures, as can be seen at 15, since sealing thereof is no longer required here.

Apertures 16 could also be formed in the portion of the cylindrical sleeve 1 which surrounds the sub-chamber $A_2$ defined by spring 3, the periphery of shoe 11, bellows 12 and said portion, so as to vent this sub-chamber $A_2$.

Following which, and whatever the embodiment adopted, a hydraulic antivibratory device is finally obtained whose construction and operation follow sufficiently from the foregoing.

This device has a number of advantages with respect to those known heretofore, in particular:

suppression of undesirable parasite hydraulic phenomena which could be due previously to the direct contact of the damping liquid with a face of the elastomer spring and immersion of the shoe in said liquid, which results in particular in reducing the dynamic stiffness of the support, not only axially but also radially, for the relatively high values of the frequency of the oscillations to be damped, and the independence between the two functions of elasticity and sealed capacity for the liquid.

Such independence makes new constructions possible and in particular it allows a spring to be formed by an element permeable to liquids such for example as an apertured elastomer body; it also allows a material resisting high temperatures to be adopted for forming the spring.

In the antivibratory device shown in FIG. 2, the elements comparable to those already described with reference to FIG. 1 bear the same reference numbers as before.

This device differs essentially from the preceding one in that it has a general annular configuration making fixing possible from the top using screwable screws, i.e. for example not only fixing of the annular frame on a vehicle chassis but that of the central hub on a vehicle engine, then suspended in the lower part.

For this, the annular frame 1 comprises not only an external cylindrical sleeve extended by a fixing flange or plate 7, but also a coaxial inner cylindrical ring 17 defining the intermediate dividing wall on the inside, then annular.

The inner diameter of this ring 17 is sufficient to allow a fixing screw 18 to pass (see further on) and a tool for tightening this screw.

Membrane 4 is also annular as well as the compensation chamber B and the same goes for the other chamber A which is here defined by the intermediate dividing wall 5, which is also annular, and by a sealed annular bellows sealingly connected to the two internal and external edges of this dividing wall.

This bellows 19 has low resistance to axial deformation and here plays the role of the membrane 12 of the preceding embodiment.

It is on the axial end or base of this bellows 19, which is the furthest away from dividing wall 5, that the edge of shoe 11 bears axially.

This shoe is here formed by a disc perforated centrally and secured, particularly by screwing of the central fixing screw 18, to a cylindrical central solid or hollow foot 2, itself fixed to the rigid element to be suspended.

It should be noted that, in this embodiment, fixing between foot 2 and the "shoe" 11 which extends it is not provided when the support is removed, but is provided during fitting of the support and remains so during the whole operating life thereof.

Spring 3 again inserted axially between a rigid narrow neck 8 forming part of frame 1 and shoe 11 here has the form of a mushroom and is perforated with a cylindrical axial bore in which foot 2 is housed possibly with a slight radial clearance.

The operation of this damping support is quite similar to that of the the preceding support: the resilient support and sealing functions are again assumed by two members connected to shoe 11 and totally independent of each other (spring 3 and bellows 12).

As is evident, and as it follows moreover already from what has gone before, the invention is in no wise limited to its modes of application and embodiments which have been more especially considered; it embraces, on the contrary, all variants thereof, particularly those in which the washer 8 coacting with shoe 11 at the time of axial tearing away forces is provided axially in the vicinity of said shoe instead of being disposed axially outside spring 3.

We claim:

1. A hydraulic antivibratory device insertable for damping and connection purposes, between two rigid elements, comprising; a rigid annular frame and a rigid base coaxial with this frame, the frame and base being securable respectively to the two rigid elements to be joined together, an annular elastomer spring resisting axial compression, inserted between the frame and the base, a flexible sealed membrane carried by the frame and defining an enclosure therewith and with a bellows, a rigid intermediate dividing wall carried by the frame and dividing the inside of the enclosure into two chambers, a restricted passage causing the two chambers to communicate permanently together, and a liquid mass contained in the two chambers and the restricted passage, the base including a shoe projecting transversely from a central foot, the annular frame comprising a rigid washer having an opening through which the foot passes, which opening is too small to allow the shoe to pass axially therethrough, the bellows being independent of the spring and offering only a low resistance to axial deformation, the periphery of the shoe being directly joined sealingly to the annular frame by at least one portion of the bellows, the surface of said bellows which is opposite to the surface which partially defines the enclosure being open to the surrounding atmosphere.

2. A device according to claim 1, wherein the spring is frusto-conical and is oriented so as to converge towards the center of the device.

3. A device according to claim 1, wherein the bellows is made from an elastomer.

4. A device according to claim 1, wherein the bellows is formed by a waterproof cloth.

5. A device according to claim 1, wherein the spring is formed by an elastomer body with apertures therethrough.

6. A device according to claim 1, wherein the enclosure formed by the two chambers is annular and has passing therethrough a screw which itself serves to secure the foot and the shoe together, the bellows connecting the edge of this show to respectively the internal and external edges of the intermediate annular dividing wall.

* * * * *